United States Patent [19]

Elbaz

[11] Patent Number: 5,560,954
[45] Date of Patent: Oct. 1, 1996

[54] METHOD FOR PREPARING A CULINARY BASE PRODUCT FROM SHELL-FISH HEADS AND CARAPACES AND MEAT CONTAINED THEREIN

[76] Inventor: Gabriel Elbaz, 32 Surrey Gardens, Westmount, Quebec, Canada, H3Y 1N6

[21] Appl. No.: 395,985

[22] Filed: Feb. 28, 1995

[51] Int. Cl.⁶ ................................................. A23L 1/33
[52] U.S. Cl. ........................... 426/589; 426/643; 426/650
[58] Field of Search .................................. 426/589, 643, 426/650, 393, 413, 479, 510, 511, 518, 523

[56] References Cited

U.S. PATENT DOCUMENTS 3,264,116  8/1966  Gray ..................................... 426/643 X

FOREIGN PATENT DOCUMENTS 58-126759  7/1983  Japan ..................................... 426/643
60-29462   7/1985  Japan ..................................... 426/643

Primary Examiner—Arthur L. Corbin
Attorney, Agent, or Firm—Robic

[57] ABSTRACT

Disclosed is a method for preparing a culinary base product from the meat-containing heads, carapaces and small claws of shell-fishes, especially lobsters, crabs and shrimps. In a first step, the meat-containing heads, carapaces and small claws of raw shell-fishes are taken off. In a second step, the heads, carapaces and small claws are cooked, preferably in a dry heat oven after having been sprayed with an edible oil. In a third step, the cooked heads, carapaces and small claws are chopped and ground in order to form a concentrate. During this step, an edible thickener, such as guar gum, is added to the concentrate, together with a concentrated liquid extract obtained from steam cooking of full shell-fishes. In a fourth step, the thickened concentrate is processed in an emulsifier in order to obtain the culinary base product in the form of a paste. In a fifth step, the paste is packaged and optionally frozen, preferably in the form of elongated, sausage-like units. The culinary base product which is so-prepared is particularly useful for the preparation of soups, bisques, sauces, terrines, stuffings and all other products necessitating a seafood culinary base.

18 Claims, 1 Drawing Sheet

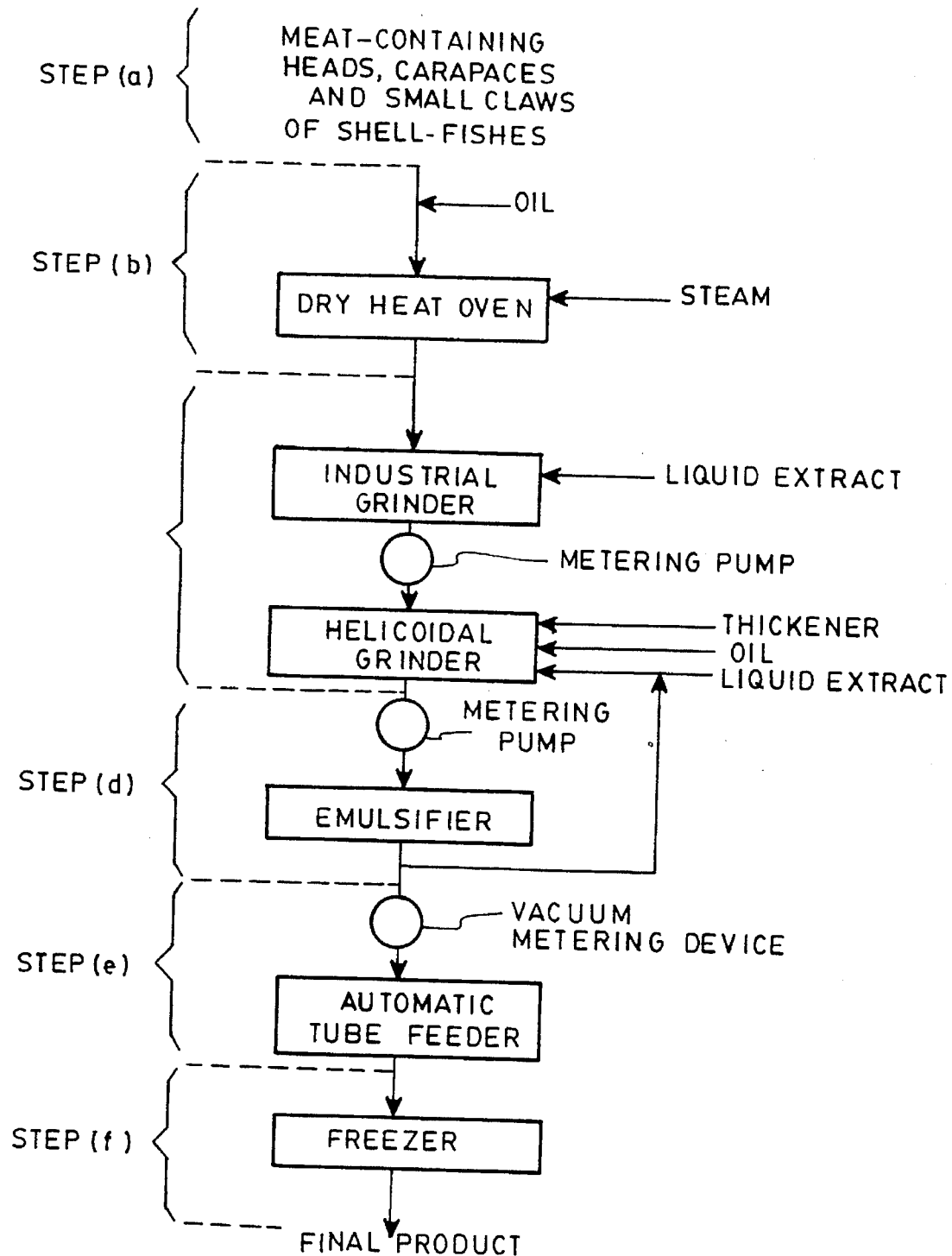

METHOD FOR PREPARING A CULINARY BASE PRODUCT FROM SHELL-FISH HEADS AND CARAPACES AND MEAT CONTAINED THEREIN

BACKGROUND OF THE INVENTION a) Field of the Invention

The present invention relates to a method for preparing a culinary base product from the meat-containing heads carapaces and, optionally small claws of shell-fishes, especially lobsters, crabs and shrimps.

The invention also relates to the culinary base product which is so-prepared.

b) Brief Description of the Prior Art

There are two main ways of industrially processing shell-fishes for sales purpose.

The first one consists in cooking the raw shell-fishes in boiling water and packaging the cooked shell-fishes as such, viz. with their heads, carapaces, claws and tails.

The other way of processing shell-fishes consists in cutting the tails and large claws, if any of the raw shell-fishes, and then freezing and packaging the so-cut tails and claws. The remaining portions of the raw shell-fishes, viz. their heads, carapaces and small claws projecting from the carapaces are usually thrown, eventhough it has already been suggested to cook them in boiling water so as to "extract" their flavor in a broth that can be used for cooking purpose. It is worth mentioning however that such broth is of limited interest, only.

SUMMARY OF THE INVENTION

It has surprisingly been discovered by the present inventor that the meat-containing heads, carapaces, small claws and the like that have so far been thrown when processing raw shell-fishes, can actually be used for preparing a culinary base product of great quality and taste, which can be used for the preparation of soups, bisques, sauces, terrines, stuffing and all other finish products necessitating a seafood culinary base.

An object of the present invention is thus to provide a method for preparing a culinary base product particularly useful for the preparation of seafood dishes, which method comprises the steps of:

(a) taking off the meat-containing heads, carapaces and, optionally, small claws of raw shell-fishes;

(b) cooking these heads, carapaces, small claws and meat contained therein;

(c) chopping and grinding the cooked heads, carapaces, small claws and meat containing therein in order to form a concentrate, and adding an edible thickener to this concentrate;

(d) further processing the thickened concentrate in an emulsifier in order to obtain the requested culinary base product in the form of a paste; and (e) packaging this paste.

Another object of the invention lies in the culinary base product which is so prepared and is preferably in the form of frozen, elongated, sausage-like units.

BRIEF DESCRIPTION OF THE DRAWINGS

The invention will be better understood upon reading of the following non restrictive description of a preferred embodiment thereof, made with reference to the accompanying drawings in which the single figure is a flow chart of the steps that must be carried out in order to obtain the requested culinary base product.

DETAILED DESCRIPTION OF A PREFERRED EMBODIMENT OF THE INVENTION

The method according to the invention for preparing a culinary base product comprises five basic steps, respectively called (a), (b), (c), (d) and (e).

Step (a)

The first step, viz step (a), basically consists in taking off the heads and carapaces of raw shell-fishes, which all contain meat. By "shell-fishes", there are meant all the shell-fishes that are edible, including lobsters, crabs and shrimps.

Step (a) is usually carried out manually, when processing raw shellfishes in order to recover their tails and large claws.

in accordance with the invention, it is not compulsory to remove the maxillas, maxillipeds and small claws from the heads and carapaces that are used as starting materials. As a matter of fact, these body portions of the shell-fishes should even be preferably kept and processed with the heads and carapaces.

However, it is compulsory that the heads and carapaces used as starting materials be raw, i.e. not cooked whatsoever before they are processed, since such a cooking would substantially affect the taste of the resulting product.

Step (b)

In the second step of the method according to the invention, the heads and carapaces of the raw shell-fishes obtained in step (a) are positioned onto trays and sprayed with an edible oil, like canola oil. The purpose of such a spraying with oil is to allow caramelization of the carapaces during subsequent cooking of the same.

Then, the trays are inserted into a dry heat oven like the one sold by BODSON (France), and cooked in it for 16 to 22 minutes at about 260° C. Advantageously, the percentage of moisture within the oven is controlled by a sensor and steam is injected at regular intervals to keep this percentage between 70 and 80% and thus to prevent the heads and carapaces from burning.

It is worth mentioning that any other kind of oven capable of dry cooking the raw material could alternatively be used, if wanted. Thus, for example, the heads and carapaces could be steam-cooked and then passed through an infrared furnace to achieve the requested caramelization.

Step (c)

The third step of the method according to the invention is carried out in two successive sub-steps.

In the first one, the cooked heads and carapaces are chopped and ground in an industrial grinder like the one sold by BRITEK (France). During this chopping and grinding step, a given amount of a concentrated liquid extract obtained from the steam cooking of full shell-fishes can be added as a flavoring and moisturizing agent. This first chopping and grinding step is preferably carried out in such a manner as to convert the chopped heads and carapaces to a concentrate having a granulometry of about 14 min.

The second one of the grinding steps is carried out in an helicoidal grinder like the one sold by PUC (Germany), into which the concentrate obtained in the first grinding step is fed with a metering pump. In this helicoidal grinder, the concentrate is processed at a speed as high as 13,000 rpm in order to reduce the granulometry of the concentrate to about 2 min. During such a processing from 0.5 to 1.5 grams per kg of concentrate, and preferably from 0.75 to 1.15 grams per kg of concentrate of a edible thickener like xanthan gum or guar gum, is added to the concentrate in order to adjust its viscosity.

Advantageously, a small amount of an edible oil like canola oil and another amount of the concentrated liquid extract obtained from the steam cooking of full shell-fishes can simultaneously be added to the concentrate in order to enhance its taste and, more importantly, to keep its percentage of moisture to 70 to 80% in order to avoid a solidification of the ground carapaces.

Some salt can also been added to the concentrate while it is processed.

By way of example, very good products were obtained in the equipment disclosed hereinabove by processing, as it has been disclosed, a mixture containing about 122.5 kg of meat-containing heads, carapaces and small claws of lobsters, about 64 kg of concentrated liquid extract, about 4.5 kg of canola oil, about 0.6 kg of salt and about 0.21 kg of a thickener (guar gum) in a powder form.

Step (d)

In the fourth step of the method according to the invention, the thickened concentrate obtained in step (c) is fed by a metering pump into an emulsifier like the one sold by HURSCHEL (USA), in which it is processed at very high speed (up to 14,000 rpm). This processing converts the concentrate into a emulsified paste which exits the emulsifier at a temperature of about 85° C., which is very close to the pasteurization temperature.

Step (e)

Last of all, in the fifth step of the method according to the invention, the paste that has been formed in step (d) is fed by a vacuum metering device like the one sold by VEMAG (Germany), into a continuous thin plastic tube supplied by an automatic tube feeder like the one sold by LATINPAK (Germany), so as to produce the requested culinary base product in the form of elongated, sausage-like units that can immediately be frozen if wanted for storage purpose.

With the above equipment, up to 600 kgs of shell-fishes can be processed per hour, which is quite interesting industrially.

The product that is so obtained has proved to be very tasty, thereby making it useful for the preparation of soups, bisques, sauces, terrines, stuffing and all other finish product necessitating a seafood culinary base. This product has also proved to be of excellent quality. As a matter of fact, it contains more than 98% of shell-fishes and meat and thus can be classified as pure and natural. Moreover, its presentation in the form of sausage-like units makes it very convenient for use and storage.

Of course, numerous obvious modifications could be made to the method disclosed hereinabove without departing from the scope of the present invention as defined in the appended clams.

I claim:

1. A method for preparing a culinary base product particularly useful for the preparation of seafood dishes, said method comprising the steps of:

(a) taking off the meat-containing heads and carapaces of raw shell-fishes;

(b) spraying said heads and carapaces with an edible oil and cooking said sprayed heads and carapaces in a dry heat oven into which steam is injected at regular intervals to prevent the heads and carapaces from burning;

(c) chopping and grinding the cooked heads and carapaces in order to form a liquid concentrate, and adding an edible thickener and a first amount of a concentrated liquid extract obtained from steam cooking of full shell-fishes, as a flavoring and moisturizing agent to said concentrate to form a thickened concentrate;

(d) further processing the thickened concentrate at high speed in an emulsifier in order to obtain said culinary base product in the form of a paste; and (e) packaging said paste.

2. The method of claim 1, wherein said shell-fishes are selected from the group consisting of lobsters, crabs and shrimps.

3. The method of claim 2, wherein the heads and carapaces taken off in step (a) incorporate the maxillas, maxillipeds and smaller claws of the shell-fishes.

4. The method of claim 2, wherein:

in step (b), the heads and carapaces are cooked in said oven at a temperature of about 260° C. for about 16 to 22 minutes;

in step (c), the cooked heads and carapaces are first chopped and then ground in two successive steps, the first one of said steps being carried out in an industrial grinder into which said first amount of a concentrated liquid extract obtained from steam cooking of full shell-fishes is added as a flavoring and moisturizing agent, the first of the grinding steps being carried out in such a manner as to convert the chopped heads and carapaces to a concentrate having a granulometry of about 14 mm, the second of said grinding steps being carried out in an helicoidal grinder into which the concentrate obtained in the first grinding step is fed with a metering pump and processed in order to reduce the granulometry of the concentrate to about 2 mm and to adjust the viscosity thereof by addition of from 0.5 to 1 gram per kg of concentrate of a thickener selected from the group consisting of xanthan gum or guar gum, together with an edible oil and a second amount of said concentrated liquid extract obtained from steam cooking of full shell-fishes and reinforced with part of the paste obtained in step (d);

in step (d), the thickened concentrate obtained in step (c) is fed by a metering pump into the emulsifier and processed therein at high speed, thereby heating the paste that is formed to a temperature of about 85° C.; and in step (e), the paste that has been formed in step (d) is fed by a vacuum metering device into a tube supplied by an automatic tube feeder so as to obtain said culinary base product in the form of elongated, sausage-like units.

5. The method of claim 4, comprising the additional step of:

(f) freezing the sausage-like units obtained in step (e).

6. A culinary base product for use in the preparation of seafood dishes, whenever prepared by the method of claim 5.

7. A culinary base product for use in the preparation of seafood dishes, whenever prepared by the method of claim 4.

8. The method of claim 1, wherein said cooking in said oven is carried out at a temperature of about 260° C. for about 16 to 22 minutes.

9. The method of claim 1, wherein, in step (c), the cooked heads and carapaces are first chopped and then ground in at least one helicoidal grinder into which said thickener is added in an amount ranging from 0.5 to 1 gram per kg of concentrate.

10. The method of claim 9, wherein, in step (c), said grinding is carried out in two successive steps, the first one of said steps being carried out in an industrial grinder and the second one of said grinding steps being carried out in said helicoidal grinder.

11. The method of claim 10, wherein:

the first grinding step is carried out in such a manner as to convert the chopped heads and carapaces to a concentrate having a granulometry of about 14 mm; and the concentrate obtained in said first grinding step is fed into the helicoidal grinder with a metering pump and processed in said grinder in order to reduce the granulometry of the concentrate to about 2 mm and to adjust the viscosity thereof by addition of the thickener.

12. The method of claim 11, wherein said thickener is selected from the group consisting of xanthan gum or guar gum and is added together with an edible oil and a second amount of said concentrated liquid extract obtained from steam cooking of full shell-fishes and reinforced with part of the paste obtained in step (d).

13. The method of claim 1, wherein the thickened concentrate obtained in step (c) is fed by a metering pump into the emulsifier and processed therein at high speed, thereby heating the paste that is formed to a temperature of about 85° C.

14. The method of claim 1, wherein, in step (e), the paste that has been formed in step (d) is fed by a vacuum metering device into a tube supplied by an automatic tube feeder, so as to obtain said culinary base products in the form of elongated, sausage-like units.

15. The method of claim 14, comprising the additional step of:

(f) freezing the sausage-like units obtained in step (e).

16. A culinary base product for use in the preparation of seafood dishes, whenever prepared by the method of claim 1.

17. The method of claim 1, wherein, in step (c), said thickener is selected from the group consisting of xanthan gum or guar gum and is added together with an edible oil and salt.

18. A culinary base product for use in the preparation of seafood dishes, whenever prepared by the method of claim 17.

\* \* \* \* \*